US005560181A

United States Patent [19]
Weder

[11] Patent Number: 5,560,181
[45] Date of Patent: *Oct. 1, 1996

[54] METHOD OF COVERING A POT

[75] Inventor: Donald E. Weder, Highland, Ill.

[73] Assignees: Southpac Trust International, Inc.; The Family Trust U/T/A, both of Oklahoma City, Okla.

[*] Notice: The term of this patent shall not extend beyond the expiration date of Pat. No. 5,111,638

[21] Appl. No.: 385,604

[22] Filed: Feb. 9, 1995

Related U.S. Application Data

[63] Continuation of Ser. No. 313,675, Sep. 27, 1994, abandoned, which is a continuation of Ser. No. 188,183, Jan. 28, 1994, Pat. No. 5,388,386, which is a continuation of Ser. No. 968,798, Oct. 30, 1992, Pat. No. 5,369,934, which is a continuation of Ser. No. 865,563, Apr. 9, 1992, Pat. No. 5,245,814, which is a continuation of Ser. No. 649,379, Jan. 31, 1991, Pat. No. 5,111,638, which is a continuation of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned.

[51] Int. Cl.$^6$ .............................. B65B 11/48; B65B 25/02
[52] U.S. Cl. ................................. 53/410; 53/461
[58] Field of Search ........................... 53/397, 399, 410, 53/449, 461, 462; 47/72; 29/469.5

[56] References Cited

U.S. PATENT DOCUMENTS

| | | |
|---|---|---|
| 732,889 | 7/1903 | Paver . |
| 1,446,563 | 2/1923 | Hughes . |
| 1,525,015 | 2/1925 | Weeks . |
| 1,807,407 | 5/1931 | Hohnhorst ................................ 47/72 |
| 1,978,631 | 10/1934 | Herrlinger ................................. 91/68 |
| 2,048,123 | 7/1936 | Howard .................................... 229/87 |
| 2,170,147 | 8/1939 | Lane ........................................ 206/56 |
| 2,278,673 | 4/1942 | Savada et al. .......................... 154/43 |
| 2,302,259 | 11/1942 | Rothfuss ................................... 41/10 |
| 2,355,559 | 8/1944 | Renner ..................................... 229/8 |
| 2,371,985 | 3/1945 | Freiberg ................................... 206/46 |
| 2,510,120 | 6/1950 | Leander ................................... 117/122 |
| 2,529,060 | 11/1950 | Trillich .................................... 117/68.5 |
| 2,621,142 | 12/1952 | Wetherell ................................. 154/117 |
| 2,822,287 | 2/1958 | Avery ...................................... 117/14 |
| 2,846,060 | 8/1958 | Yount ...................................... 206/58 |
| 2,850,842 | 9/1958 | Eubank Jr. .............................. 47/58 |
| 3,022,605 | 2/1962 | Reynolds ................................. 47/58 |
| 3,121,647 | 2/1964 | Harris et al. ............................ 118/202 |
| 3,130,113 | 4/1964 | Silman ..................................... 161/97 |

(List continued on next page.)

FOREIGN PATENT DOCUMENTS

| | | |
|---|---|---|
| 2610604 | 8/1988 | France . |
| 345464 | 2/1917 | Germany . |

OTHER PUBLICATIONS

"Speed Cover –The Simple Solution for Those Peak Volume Periods", Highland Supply Corporation, 1989, 5 pgs.
"Speed Sheets and Speed Rolls", Highland Supply Corporation, 1990, 2 pgs.
"A World of Cut Flower and Pot Plant Packaging", Klerks Plastic Products Manufacturing, date unknown, 6 pages. Applicant admits that the products described in this brochure have been on sale at least more than one year prior to the filing of the present patent application.

*Primary Examiner*—Horace M. Culver
*Attorney, Agent, or Firm*—Dunlap & Codding, P.C.

[57] ABSTRACT

A method and apparatus for covering portions of an object having an outer peripheral surface with a sheet of material having an upper surface and a lower surface with a pressure sensitive adhesive on at least a portion of the lower surface by wrapping the sheet of material about portions of the outer peripheral surface and positioning the sheet of material so that the pressure sensitive coating either contacts portions of the outer peripheral surface of the object and is bonded thereto or contacts overlapping portions of the sheet of material and is bonded to other adjacent portions of the sheet of material having the pressure sensitive coating thereon or overlapping portions of the sheet of material are bonded by the pressure sensitive adhesive.

45 Claims, 4 Drawing Sheets

U.S. PATENT DOCUMENTS

| | | | |
|---|---|---|---|
| 3,271,922 | 9/1966 | Wallerstein et al. | 53/3 |
| 3,508,372 | 4/1970 | Wallerstein et al. | 53/3 |
| 3,620,366 | 11/1971 | Parkinson | 206/59 |
| 3,681,105 | 8/1972 | Milutin et al. | 117/15 |
| 3,793,799 | 2/1974 | Howe et al. | 53/32 |
| 4,054,697 | 10/1977 | Reed et al. | 428/40 |
| 4,118,890 | 10/1978 | Shore | 47/28 |
| 4,189,868 | 2/1980 | Tymchuck et al. | 47/84 |
| 4,216,620 | 8/1980 | Weder et al. | 47/72 |
| 4,280,314 | 7/1981 | Stuck | 53/241 |
| 4,297,811 | 11/1981 | Weder | 47/72 |
| 4,300,312 | 11/1981 | Weder | 47/72 |
| 4,333,267 | 6/1982 | Witte | 47/84 |
| 4,380,564 | 4/1983 | Cancio et al. | 428/167 |
| 4,400,910 | 8/1983 | Koudstaal et al. | 47/84 |
| 4,413,725 | 11/1983 | Bruno et al. | 206/45.33 |
| 4,546,875 | 10/1985 | Zweber | 206/0.82 |
| 4,621,733 | 11/1986 | Harris | 206/423 |
| 4,640,079 | 2/1987 | Stuck | 53/390 |
| 4,765,464 | 8/1988 | Ristvedt | 206/0.82 |
| 4,799,520 | 1/1989 | Blackburn et al. | 150/52 |
| 4,801,014 | 1/1989 | Meadows | 206/423 |
| 4,941,572 | 7/1990 | Harris | 206/423 |
| 5,111,638 | 5/1992 | Weder | 53/397 |
| 5,228,234 | 7/1993 | de Klerk et al. | 47/41.01 |
| 5,235,782 | 8/1993 | Landau | 47/72 |
| 5,239,775 | 8/1993 | Landau | 47/72 |
| 5,318,821 | 6/1994 | Bradley, Jr. | 47/72 X |

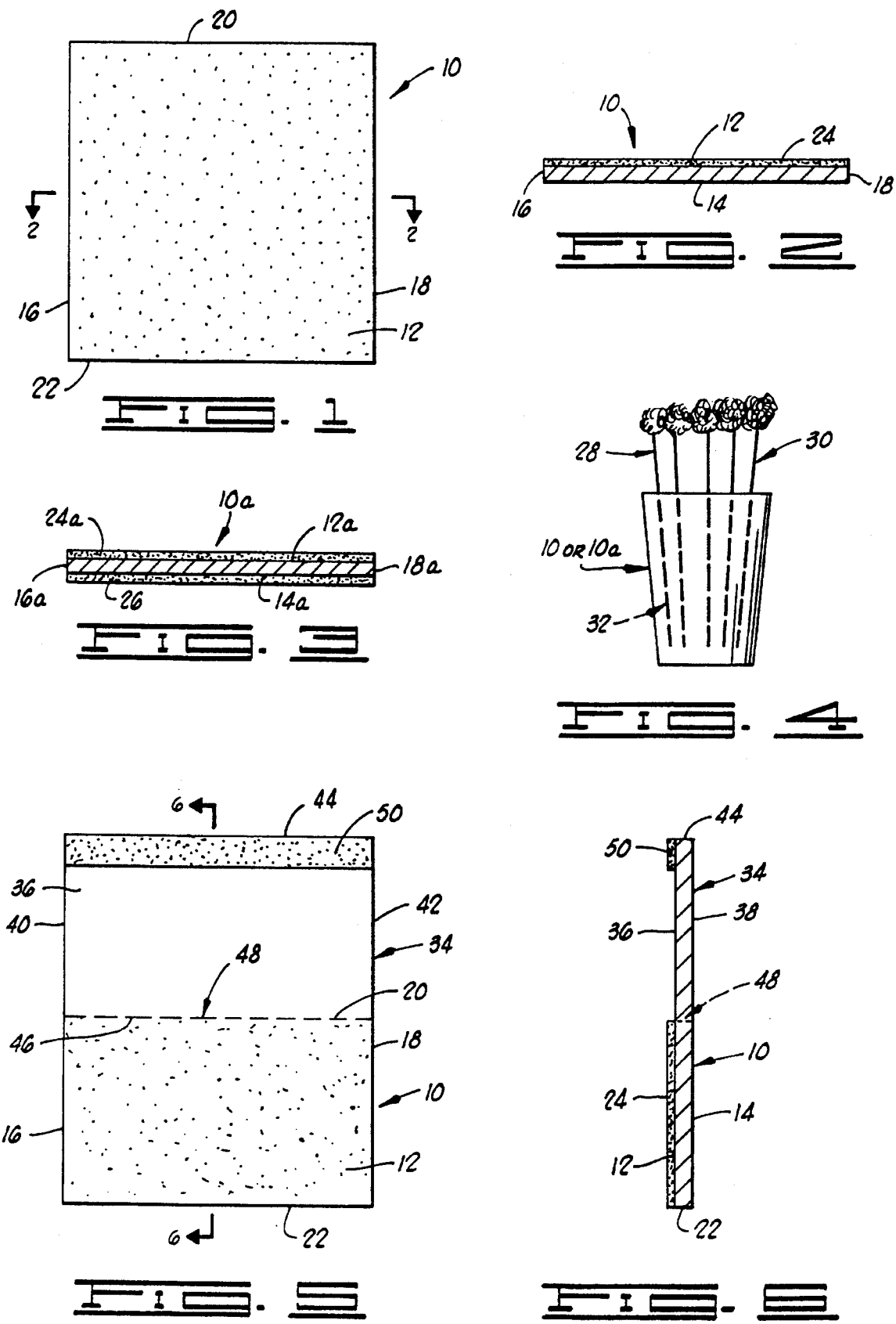

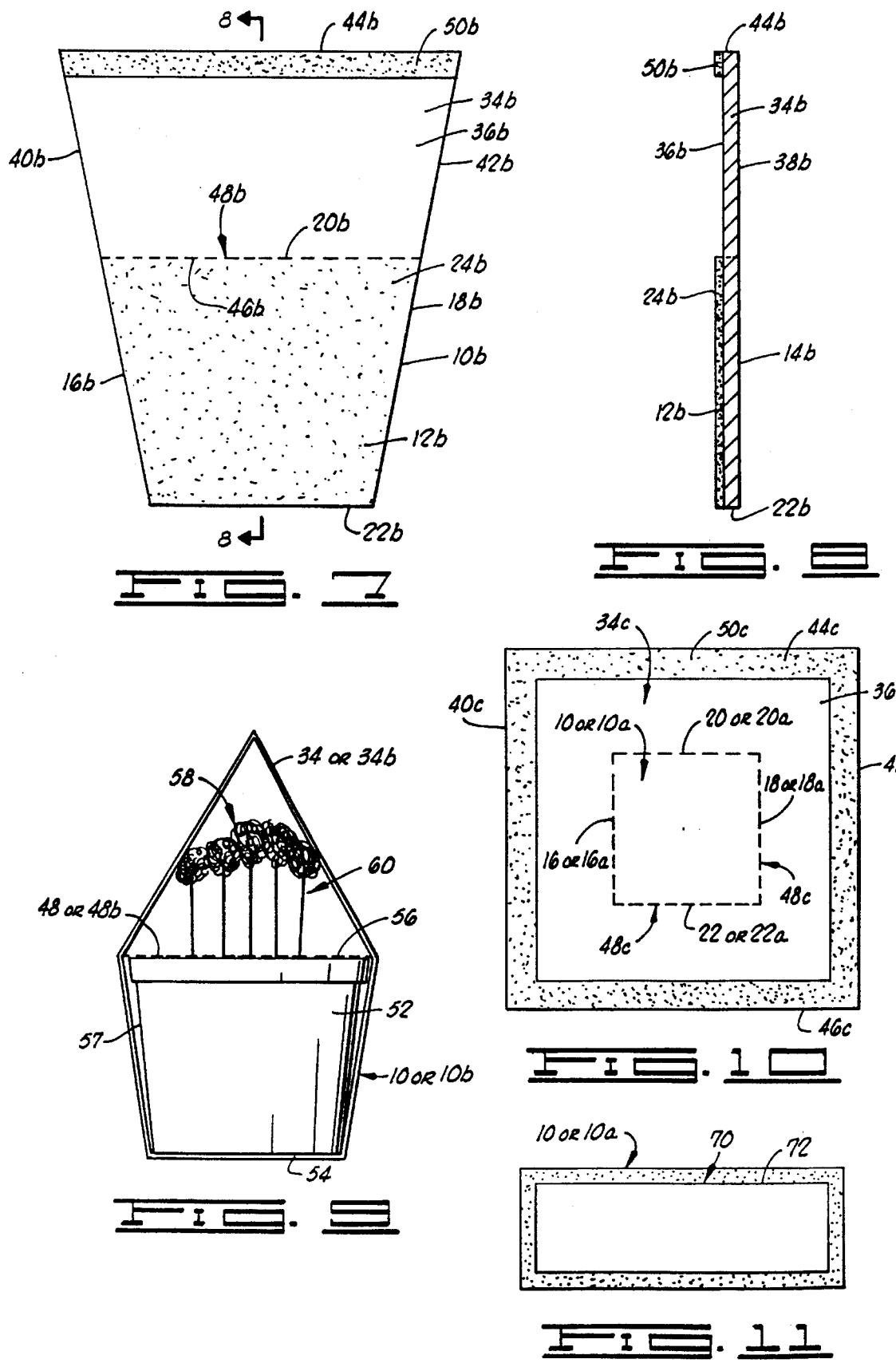

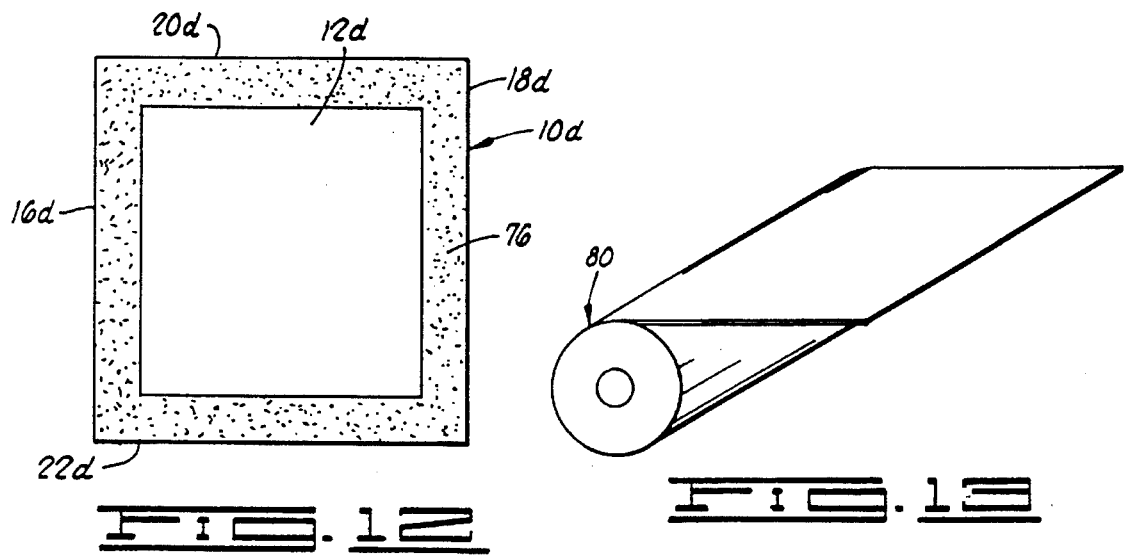
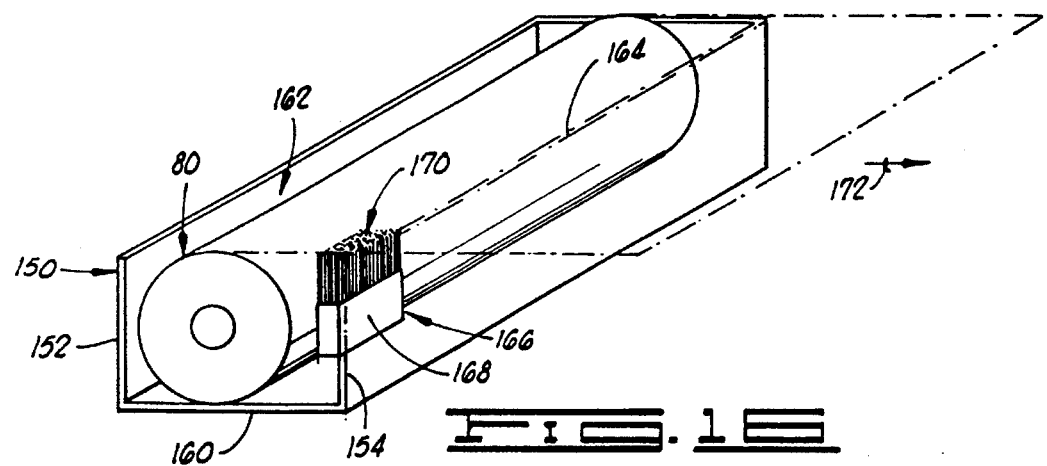
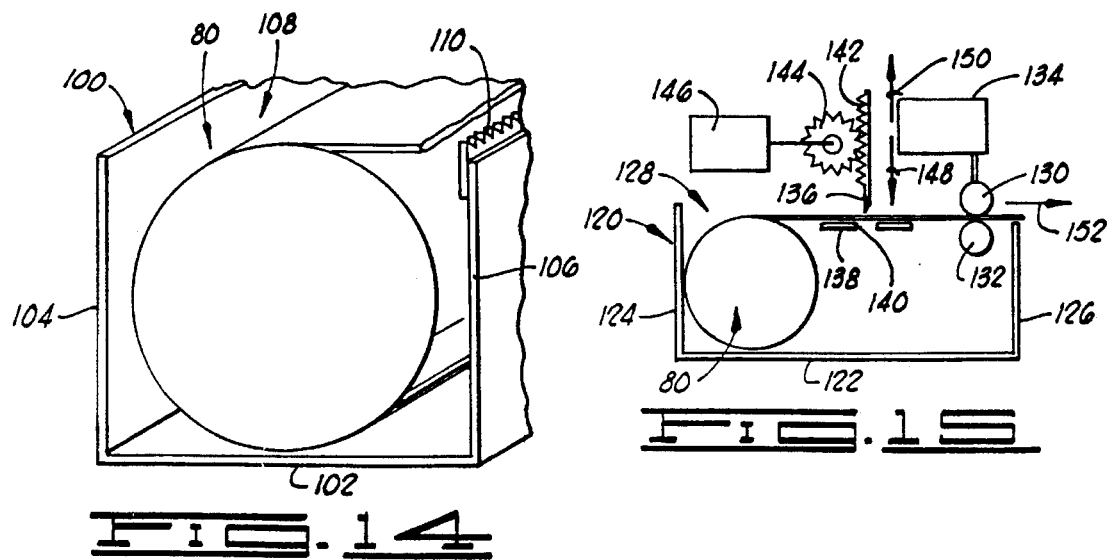

5,560,181

METHOD OF COVERING A POT

This application is a continuation of U.S. Ser. No. 08/313,675, filed Sep. 27, 1994, entitled "METHOD FOR WRAPPING AN OBJECT WITH AN EMBOSSED MATERIAL", now abandoned, which is a continuation of U.S. Ser. No. 08/188,183, filed Jan. 28, 1994, entitled "METHOD FOR WRAPPING AN OBJECT WITH AN EMBOSSED MATERIAL HAVING AN ADHESIVE THEREON", now U.S. Pat. No. 5,388,386, issued Feb. 14, 1995, which is a continuation of U.S. Ser. No. 07/968,798, filed Oct. 30, 1992, entitled "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL", now U.S. Pat. No. 5,369,934, issued Dec. 6, 1994, which is a continuation of U.S. Ser. No. 07/865,563, filed Apr. 9, 1992, entitled "METHODS FOR WRAPPING A FLORAL GROUPING", now U.S. Pat. No. 5,245,814, issued Sep. 21, 1993, which is a continuation of 07/649,379, filed Jan. 31, 1991, entitled "METHOD FOR WRAPPING AN OBJECT WITH A MATERIAL HAVING PRESSURE SENSITIVE ADHESIVE THEREON", now U.S. Pat. No. 5,111,638, issued May 12, 1992, which is a continuation of U.S. Ser. No. 07/249,761, filed Sep. 26, 1988, entitled "METHOD FOR WRAPPING AN OBJECT WITH A MATERIAL HAVING PRESSURE SENSITIVE ADHESIVE THEREON", now abandoned, which is a continuation-in-part of U.S. Ser. No. 07/219,083, filed Jul. 13, 1988, entitled "ARTICLE FORMING SYSTEM", now U.S. Pat. No. 4,897,031, issued Jan. 30, 1990, which is a continuation of U.S. Ser. No. 07/004,275, filed Jan. 5, 1987, entitled "ARTICLE FORMING SYSTEM", now U.S. Pat. No. 4,773,182, issued Sep. 27, 1988, which is a continuation of U.S. Ser. No. 06/613,080, filed May 22, 1984, entitled "ARTICLE FORMING SYSTEM", now abandoned.

BACKGROUND OF THE INVENTION

FIELD OF THE INVENTION

The present invention relates generally to materials for wrapping objects and, more particularly, but not by way of limitation, to a sheet of material for covering portions of an object wherein a pressure sensitive adhesive is on a portion of the sheet of material.

BRIEF DESCRIPTION OF THE DRAWINGS

FIG. 1 is a top plan view of a sheet of material constructed in accordance with the present invention.

FIG. 2 is a sectional view of the sheet of material shown in FIG. 1 taken substantially along the lines 2—2 of FIG. 1.

FIG. 3 is a cross sectional view, similar to FIG. 2, but showing a modified sheet of material constructed in accordance with the present invention.

FIG. 4 is a diagrammatic view of a floral grouping having either the sheet of material shown in FIGS. 1 and 2 or the sheet of material shown in FIG. 3 wrapped about a portion thereof.

FIG. 5 is a top plan view of another modified sheet of material constructed in accordance with the present invention.

FIG. 6 is a cross sectional view of the modified sheet of material shown in FIG. 5, taken substantially along the lines 6—6 of FIG. 5.

FIG. 7 is another modified sheet of material constructed in accordance with the present invention.

FIG. 8 is a sectional view of the modified sheet of material shown in FIG. 7 taken substantially along the lines 8—8 of FIG. 7.

FIG. 9 is a diagrammatic view of a flower pot having a floral grouping supported or disposed therein with the sheet of material shown in FIG. 5 wrapped about a portion of the flower pot and the floral grouping.

FIG. 10 is a view of another modified sheet of material constructed in accordance with the present invention.

FIG. 11 is a partial view of a package having either the sheet of material shown in FIGS. 1 and 2 or the sheet of material shown in FIG. 3 wrapped about a portion of the package.

FIG. 12 is a plan view of another modified sheet of material.

FIG. 13 is a roll of material from which sheets of material constructed in accordance with the present invention may be obtained.

FIG. 14 is a partial perspective view of a container holding a roll of material from which sheets of material constructed in accordance with the present invention may be obtained.

FIG. 15 is a schematic view of another container holding a roll of material from which sheets of material constructed in accordance with the present invention may be obtained.

FIG. 16 is a perspective view of another container for holding a roll of material from which sheets of material constructed in accordance with the present invention may be obtained.

BRIEF DESCRIPTION OF THE PREFERRED EMBODIMENT

Figure 17:
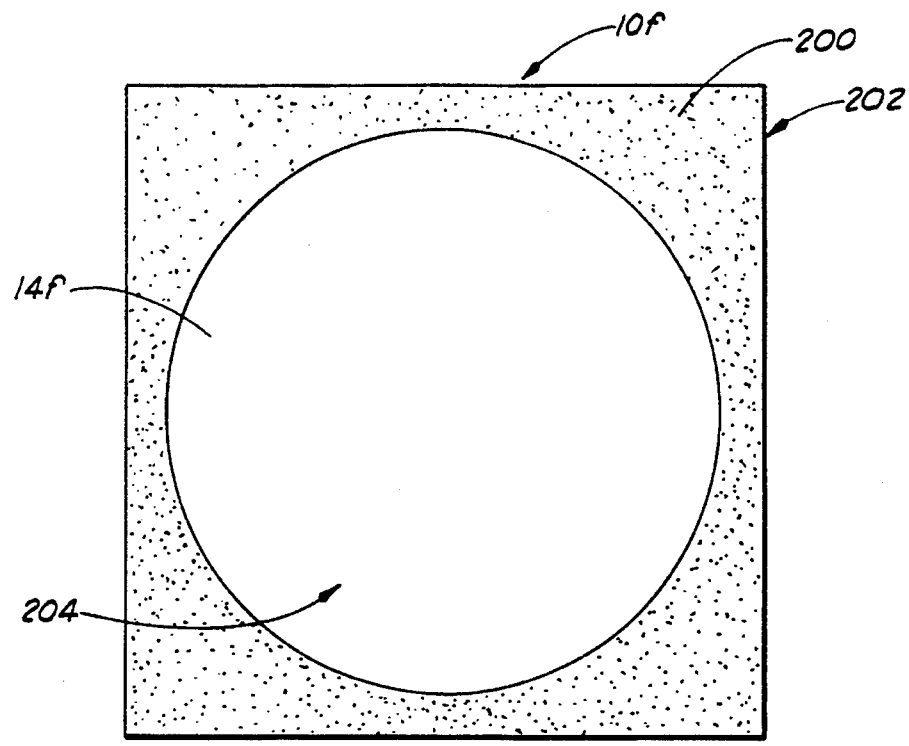
FIG. 17 is a plan view of the lower surface of another modified sheet of material constructed in accordance with the present invention.

Referring to the drawings in FIGS. 1 and 2 in particular, shown therein and designated by the general reference numeral 10 is a sheet of material constructed in accordance with the present invention. The sheet of material 10 has an upper surface 12, a lower surface 14, a first side 16, and an opposed second side 18 spaced a distance from the first side 16, a first end 20 and an opposed second end 22 spaced a distance from the first end 20. The sheet of material 10 shown in FIG. 1 is generally square or rectangular shaped; however, the sheet of material 10 could be circularly shaped or any other configuration desired in a particular application.

The sheet of material 10 is a relatively thin sheet of material having a thickness in the range of from less than about 1.0 mils to about 2.5 mils. The upper limit on the thickness may vary depending on the type of material. The upper limit on the thickness is set such that the material retains sufficient flexibility and fold ability so that the material easily can be shaped by hand about the object to be covered. As a practical matter, the upper limit is about 20 mils. The sheet of material is constructed of any one of the materials selected from a group of materials comprising paper, foil, cellophane or processed organic polymer films or combinations thereof.

In one preferred embodiment, the sheet of material is constructed from a relatively thin film of a non-shape sustaining processed organic polymer film. The term "processed organic polymer film" as used herein means a manmade resin such as polypropylene as opposed to naturally occurring resins such as cellophane. A processed organic polymer film is relatively strong and not as readily subject to tearing (substantially non-tearable when used to cover portions of an object) as might be paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications which is not true of an untreated paper, for example; unless the paper is treated with a water resistant coating or impregnated with a water resistant material or by laminating the paper. It also should be noted that some papers such as long fiber papers are substantially resistant to tearing (substantially non-tearable when used to cover an object). In addition, a relatively thin film of a substantially linearly linked processed organic polymer does not substantially deteriorate in sunlight.

A decorative pattern such as a solid color and/or an embossed pattern (not shown) and/or other decorative surface ornamentation is applied to the upper and or lower surface 12 or 14 in one preferred embodiment.

As shown in FIG. 2, a pressure sensitive adhesive 24 is applied to the upper surface 12 of the sheet of material 10 and, in the embodiment shown in FIGS. 1 and 2, the pressure sensitive adhesive 24 covers substantially the entire upper surface 12 of the sheet of material 10, the thickness of the pressure sensitive adhesive. 24 being greatly exaggerated in FIG. 2. In some embodiments, the pressure sensitive adhesive 24 may cover only preselected portions of the upper surface 12 of the sheet of material. The pressure sensitive adhesive may be any substance, inorganic or organic, natural or synthetic, that is capable of bonding to other surfaces or to other surfaces coated with a like pressure sensitive adhesive. The tack level of the pressure sensitive adhesive should be controlled in most applications so that the sheet of material does not destroy or substantially damage the object bonded thereto when removed from the object or does not destroy any decorative pattern which is applied to the upper and or lower surface 12 or 14 when unbended.

The term "pressure sensitive adhesive" as used herein includes those adhesives mentioned before and it is utilized herein to indicate an adhesive which is bondable by the application of a slight pressure such as might be imposed by the hand of an individual for example, as opposed to those adhesive requiring chemical activators or heat to be bondable. Pressure sensitive adhesives and the controlling of the tack level of such pressure sensitive adhesive are well known in the art and a detailed description of such pressure sensitive adhesives is not deemed necessary herein.

Embodiment of FIG. 3

Shown in FIG. 3 is a modified sheet of material 10a which is constructed exactly like the sheet of material 10 shown in FIGS. 1 and 2 and described in detail before, except the sheet of material 10a includes a pressure sensitive adhesive 26 applied to the lower surface 14a of the sheet of material 10a in addition to the pressure sensitive adhesive 24a applied to the upper surface 12a of the sheet of material 10a. The pressure sensitive adhesive 26a is exactly like the pressure sensitive adhesive 24 described before. In some applications, it may be desirable to have both the pressure sensitive adhesive 24a applied to the upper surface 12a of the sheet of material 10a as well as the pressure sensitive adhesive 26 applied to the lower surface 14a of the sheet of material 10a, the thicknesses of the pressure sensitive adhesive 24a and 26 being greatly exaggerated in FIG. 3. The pressure sensitive adhesive 26, as shown in FIG. 3, substantially covers the entire lower surface 14a of the sheet of material 12a, although it could be applied only to selected portions of the sheet of material, Embodiment of FIG. 4

Shown diagrammatically in FIG. 4 is one use of the sheet of material shown in FIGS. 1 and 2 or the sheet of material 10a shown in FIG. 3. A floral grouping 28 is diagrammatically shown in FIG. 4 and the floral grouping 28 generally has an upper end portion 30 and a lower end portion 32, the lower end portion 32 comprising mostly the stem portion of the flowers illustrated in FIG. 4 and the upper end portion 30 of the floral grouping 28 comprising the flower end of the flowers diagrammatically shown in FIG. 4. The term "floral grouping" as used herein means arrangements of cut, fresh flowers, artificial flowers and other fresh and/or artificial plants and such arrangements may include other secondary plants which add to the aesthetics of the overall floral grouping.

The sheet of material 10 or 10a is wrapped about the lower end portion 32 of the floral grouping 28 so portions of the sheet of material overlap and the overlapping portions are bonded together by contacting the pressure sensitive adhesive 24 on the sheet of material 10 or 10a with adjacent overlapping portions of the sheet of material 10 or 10a by contacting the pressure sensitive adhesive 24 and or 24a and 26 on the upper and lower surface 12 or 12a and 14 or 14a with adjacent overlapping portions of the sheet of material 10 or 10a so that the sheet of material 10 or 10a substantially encompasses the lower end portion 32 of the floral grouping 28 and is secured thereabout by the bonding of the overlapping portions of the sheet of material 10 or 10a.

Utilizing the sheet of material 10 or 10a, when an individual purchases the floral grouping 28 such as diagrammatically shown in FIG. 4, the seller simply takes the sheet of material 10 or 10a wraps the sheet of material 10 or 10a about the lower end portion 32 of the floral grouping 28 and the sheet of material 10 or 10a is secured about the lower end portion 32 of the floral grouping 28 by the bonding of the overlapping portions of the sheet of material 10 or 10a as described before. Thus, the sheet of material 10 or 10a provides an easy and convenient means for wrapping the lower end portions 32 of the floral grouping 28 and, utilizing the sheet of material 10 or 10a, the sheet of material 10 or 10a is secured in place wrapped about the lower end portion 32 of the floral grouping 28 without requiring any additional means for securing the sheet of material in the wrapped position about the lower end portion 32 of the floral grouping 28. The sheet of material 10 or 10a preferably is a foil, cellophane or a processed organic polymer film in this application.

Embodiment of FIGS. 5 and 6

Shown in FIGS. 5 and 6 is the sheet of material 10 having a sheet extension 34 secured to the first end 20 thereof. More particularly, the sheet extension 34 includes an upper surface 36, a lower surface 38, a first side 40, a second side 42, a first end 44 and a second end 46. The second end 46 of the sheet extension 34 is secured to the first end 20 of the sheet of material 10 and the second end 46 of the sheet extension 34 extends substantially along the entire length of the first end of the sheet of material 10 generally between the first and the second sides 16 and 18 of the sheet of material. As shown in FIGS. 5 and 6, a line of perforations 48 is formed along the connection between the second end 46 of the sheet extension 34 and the first end 16 of the sheet of material 10 for reasons which will be made more apparent below. The sheet of material 10 preferably has a decorative pattern (such as a color and/or an embossed pattern) and/or other decorative surface ornamentation on the upper surface 12, and or the lower surface 14, as mentioned before.

A pressure sensitive adhesive 50 is applied to the upper surface 36 of the sheet extension 34. The pressure sensitive adhesive 50 extends generally between the first side 40 and the second side 42 and extends a distance generally from the first end 44 of the sheet extension 34 generally toward the second end 46. Although the pressure sensitive adhesive 50 is shown in FIG. 5 applied only to the upper surface 36, it is should be noted that a similar pressure sensitive adhesive may be applied to the lower surface 38 of the sheet extension 34 generally opposite the pressure sensitive adhesive 50. Also, it should be noted that the sheet of material 10a equally could be utilized in the embodiment of the invention shown in FIGS. 5 and 6.

Embodiment of FIGS. 7 and 8

Shown in FIG. 6 is a modified of sheet of material 10b which is constructed exactly like the sheet of material 10, except the first and the second sides 16b and 18b each are tapered inwardly generally from the first end 20b toward the second end 22b so the length of the first end 20b generally between the first and the second sides 16b and 18b is generally longer than the length of the shorter second end 22b generally between the first and the second sides 16b and 18b.

A modified sheet extension 34b is connected to the first 20b of the sheet of material 10b. The sheet extension 34b is constructed exactly like the sheet extension 34 shown in FIGS. 5 and 6 and described in detail before, except the first and the second sides 40b and 42b each are tapered inwardly generally from the first end 44b toward the second end 46b. When the sheet extension 34b is connected to the sheet of material 10b, the first side 16b of the sheet of material 10b is generally aligned with the first side 40b of the sheet extension 34b and the taper of the first side 16b is substantially the same as the taper of the first side 40b so the first side 16b a and 40b are aligned and taper inwardly generally from the first end 44b of the sheet extension 34b generally toward the second end 22b of the sheet of material 10b so the length of the first end 44b of the sheet extension 34b generally between the first and the second sides 42b and 44b is generally longer than the length of the second end 22b of the sheet of material 10b generally between the first and the second sides 16b and 18b of the sheet of material 10b. A line of perforations 48b is formed along the connection between the second end 46 of the sheet extension 34b and the first end 20b of the sheet of material 10b.

The pressure sensitive adhesive 50b is applied on the upper surface 36b generally near the first end 44b of the sheet extension 34b. The pressure sensitive adhesive 50b extends generally between the first side 40b and the second side 42b and extends a distance from the first end 44b generally toward the second end 46b. Although the pressure sensitive adhesive 50b is shown only on the upper surface 36b of the sheet extension 34b, a similar pressure sensitive adhesive strip may be applied to the lower surface 38b of the sheet extension 34b generally opposite the pressure sensitive adhesive 50b. Also, a modified sheet of material 10a could be utilized in lieu of the sheet of material 10 in the embodiment of the invention shown in FIGS. 7 and 8.

Embodiment of FIG. 9

Shown in FIG. 9 is a flower pot 52 having a substantially closed lower end 54, and an open upper end 56 and an outer peripheral surface 57. The flower pot 52 is adapted to receive portions of a floral grouping within an opening formed generally between the lower end 54 and the open upper end 56 and to support such a floral grouping with a portion of the floral arrangement extending generally outwardly from the open upper end 56. The term "floral grouping" as used in this context means a potted plant or flower, although a flower pot could be utilized to hold cut fresh flowers or cut plants or artificial flowers if one so desired.

Flower pots of the type described before in connection with the flower pot 52 are common and well known in the art and a detailed description of such a flower pot is not deemed necessary herein.

Also, diagrammatically shown in FIG. 9 is a floral grouping 58 having an upper end portion 60 and a lower end portion (not shown in FIG. 9). The floral grouping 58 is similar to the floral grouping 28 described before in connection with FIG. 4. However, the lower end portion of the floral grouping 58 is disposed in the flower pot 52 and the flower pot 52 together with the contents of the flower pot 52, such as soil or other support means, cooperates to support the floral grouping 58 in an upright position with the upper end portion 60 of the floral grouping 58 extending outwardly from the open upper end 56 of the flower pot 52 and extending a distance generally above the open upper end 56 of the flower pot 52.

Utilizing either the sheet of material 10 shown in FIGS. 5 and 6 or the sheet of material 10b shown in FIGS. 7 and 8, the individual places the sheet of material about the flower pot 52 so that the pressure sensitive adhesive 24 or 24b on the upper surface 12 or 12b is disposed generally adjacent the outer peripheral surface 57 of the flower pot 52 and the individual wraps the sheet of material 10 or 10b about the outer peripheral surface 57 of the flower pot 52, the individual pressing the sheet of material 10 or 10b against the outer peripheral surface 57 so that the pressure sensitive adhesive 24 or 24b contacts and bonds to the outer peripheral surface 57. The individual wraps the sheet of material 10 or 10b about the entire outer peripheral surface of the flower pot 52 and bonds the sheet of material 10 or 10b to the outer peripheral surface 57 of the flower pot 52 by way of the pressure sensitive adhesive 24a thereby bonding the sheet of material 10 or 10b to the outer peripheral surface 57 of the flower pot 52. The sheet of material 10 or 10b has a width extending generally between the first end and the second end so that the sheet of material extends 10 or 10b about the entire outer peripheral surface 57 and generally between the closed lower end 54 and the open upper end 56 of the flower pot 52, the line of perforations 48 or 48b being disposed generally adjacent or extending a distance generally above the open upper end 56 of the flower pot 52 when the sheet of material 10 or 10b has been wrapped about the outer peripheral surface 57 of the flower pot 52. After the sheet of material 10a has been wrapped about and bonded to the outer peripheral surface 57 of the flower pot 52, the sheet extension 34 or 34b extends a distance above the open upper end 56 of the flower pot 52 and the height of the sheet extension 34 or 34b extending generally between the first end 44 or 44b and the second end 46 or 46b is sufficient so that the sheet extension 34 or 34b extends generally above the upper end portion 60 of the floral grouping 58. The individual then wraps the sheet extension 34 or 34b generally about the upper end portion 60 of the floral grouping 58, portions of the first end 44 or 44b of the sheet extension 34 or 34b being overlapped. The individual then secures the first end 44 or 44b in a sealed or closed position by bonding the overlapping portions of the first end 44 or 44b of the sheet extension 34 or 34b with the bonding occurring as a result of the pressure sensitive adhesive 50 or 50b contacting the adjacent overlapping portions of the sheet extension 34 or 34b generally near the first end 44 or 44b. In this position of the sheet of material 10 or 10b with the sheet extension 34 or 34b attached thereto, the sheet extension 34 or 34b substantially encompasses and surrounds the upper end portion 60 of the floral grouping 58.

The sheet of material 10 or 10b preferably includes a decorative pattern, as mentioned before, and thus the outer peripheral surface 57 of the flower pot 52 substantially is covered with a decorative covering provided by the sheet of material 10 or 10b. Further, in the assembled position of the sheet of material 10 or 10b about the outer peripheral surface 57 of the flower pot 52, the floral grouping 58 remains protected since the floral grouping 58 is covered by the sheet extension 34 or 34b, yet the floral grouping 58 remains substantially exposed for displaying the floral grouping 58 since the sheet extension 34 or 34b substantially is clear (see through).

The sheet extension 34 or 34b can be removed from the sheet of material 10 or 10b attached thereto by an individual purchaser by breaking the bond at the first end 44 or 44b formed by the pressure sensitive adhesive 50 or 50b and tearing the sheet extension 34 or 34b from the sheet of material 10 or 10b connected thereto generally along the line of perforations 48 or 48b. After the sheet extension 34 or 34b has been removed from the sheet of material 10 or 10b connected thereto, the sheet of material 10 or 10b remains bonded or connected to the outer peripheral surface 57 of the flower pot 52 to provide a decorative covering for the flower pot 52.

The sheet extension 34 or 34b preferably is constructed from the same materials mentioned before with respect to the sheet of material 10, 10a or 10b and preferably, the sheet extension 34 or 34b and the sheet of material are constructed of the processed organic polymer film, although the sheet of material also could be constructed of a foil or cellophane or paper. Thus, the sheet of material 10 or 10b substantially is waterproof, thereby preventing leakage from the flower pot 52 from escaping through the sheet of material 10 or 10b. Further, since the sheet extension 34 or 34b is substantially is waterproof, the sheet extension 34 or 34b cooperates to retain moisture within the area enclosed by the sheet extension 34 or 34b, the sheet extension 34 or 34b cooperating with the sheet of material 10 or 10b to retain moisture thereby cooperating to retain the freshness of the floral grouping when the floral grouping consist of either fresh cut flowers or fresh growing flowers.

It should be noted that, in the embodiment shown in FIG. 9, the sheet of material 10 or 10b has a height generally between the first end 20a or 20b and the second end 22a or 22b sufficient so that a portion of the sheet of material generally near the second end 22 or 22b can be wrapped about the closed lower end 54 of the flower pot 52, the closed lower end 54 comprising a portion of the outer peripheral surface 57 of the flower pot 52. In this embodiment, the sheet of material 10 or 10b initially is placed adjacent a portion of the outer peripheral surface 57 of the flower pot 52 with the first end 20 or 20b disposed generally near the open upper end 56 of the flower pot 52 and the second end 22 or 22b of the sheet of the material 10 or 10b extending a distance beyond the closed lower end 54 of the flower pot 52. The sheet of material 10 or 10b is then wrapped about the outer peripheral surface 57 with a portion of the sheet of material 10 or 10b generally near the second end 22 or 22b being formed over the closed lower end 54 of the flower pot 52. Also, it should be noted that the sheet of material 10 or 10a without the sheet extension 34 or 34b can be applied to the outer peripheral surface 57 of the flower pot 52 to provide a decorative flower pot cover.

In an alternative embodiment, the pressure sensitive adhesive can be applied to the flower pot for adhesively connecting the sheet of material to the flower pot.

Embodiment of FIG. 10

Shown in FIG. 10 is the sheet of material 10 or 10a having another modified sheet extension 34c connected thereto. The sheet of material 10 or 10a is constructed exactly like the sheet of material 10 or 10a described before in connection with FIGS. 1, 2, 3 and 4. The sheet extension 34c is generally rectangularly shaped and has a rectangularly shaped opening formed in a central portion thereof, the rectangularly shaped opening formed in a central portion of the sheet extension 34c being defined in FIG. 10 by the rectangularly shaped line of perforations 48c. The sheet extension 34c is connected to the outer peripheral surface of the sheet of material 10 or 10a generally at the line of perforations 48c so that the sheet extension 34c extends outwardly from the first side 16 or 16a, outwardly from the second side 18 or 18a, outwardly from the first end 20 or 20a and outwardly from the second end 22 or 22a. A modified pressure sensitive adhesive 50c is applied to a portion of the upper surface 36c of the sheet extension 34c, the pressure sensitive adhesive 50c extending about the sheet extension 34c generally near the first side 40c, the second side 42c, the first end 44c and the second end 46c.

Utilizing the sheet of material 10 or 10a with the sheet extension 34c connected thereto to cover the flower pot 52 and floral grouping 58 shown in FIG. 9, the flower pot 52 is disposed generally in a central portion of the sheet of material 10 or 10a so that the closed lower end 54 of the flower pot 52 is disposed generally adjacent the pressure sensitive adhesive, the closed lower end 54 contacting the pressure sensitive adhesive thereby bonding the closed lower end 54 to a central portion of the sheet of material 10 or 10a. An individual then forms the sheet of material 10 or 10a upwardly about the outer peripheral surface 57 of the flower pot 52 with the pressure adhesive sensitive being disposed generally adjacent and contacting the outer peripheral surface 57 of the flower pot 52. As the individual forms the sheet of material 10 or 10a about the outer peripheral surface 57 of the flower pot 52, the individual presses the sheet of material 10 or 10a generally against the outer peripheral surface of the flower pot 52 thereby bonding the sheet of material 10 or 10a to the outer peripheral surface 57 of the flower pot 52 by way of the pressure sensitive adhesive. When the sheet of material 10 or 10a has been wrapped and bonded about the outer peripheral surface 57 of the flower pot 52, the first side 16 or 16a, the second side 18 or 18a, the first end 20 or 20a and the second end 22 or 22a each is disposed generally adjacent or extends a distance above the open upper end 56 of the flower pot 52.

After the sheet of material 10 or 10a has been connected to the outer peripheral surface 57 of the flower pot 52, the individual then forms the sheet extension 34c generally about the upper end portion 60 of the floral grouping 58 overlapping portions of the sheet extension 34c generally near the first side 40c, the second side 42c, the first end 44c and the second end 46c, the overlapping portions being bonding or connected together by way of the pressure sensitive adhesive 50c. Thus, the sheet of material 10 or 10a with the sheet extension 34c operates in a manner like that described in connection with FIG. 9 to provide a decorative cover for the flower pot 52 while simultaneously providing a covering for the upper end portion 60 of the floral grouping 58. When it is desired to remove the sheet extension 34c from the sheet of material 10 or 10a, the individual disconnects the bond form at the overlapping portions by the pressure sensitive adhesive 50c and tears the sheet extension 34c from the sheet of material 10 or 10a by tearing generally along the line of perforations 48c.

Embodiment of FIG. 11

Shown in FIG. 11 is a package 70 which has an outer peripheral surface 72. The sheet of material 10 or 10a is shown in FIG. 11 wrapped about the outer peripheral surface 72 of the package 70 (the thickness of the sheet of material 10 or 10a being greatly exaggerated in FIG. 11). In this instance, the sheet of material 10 or 10a is used as a gift wrapping for the package 70 and thus the sheet of material 10 or 10a also includes a decorative pattern, as mentioned before, applied to the upper and or the lower surface 12 or 12a or 14 or 14a, the decorative pattern being a color and/or an embossed pattern and/or other pattern or surface ornamentation.

When the sheet of material 10 or 10a is utilized as a gift wrapping for the package 70, it is preferable in some applications that the pressure sensitive adhesive 24 and or 26 be of a type which only will bond to itself. In this instance, when the sheet of material 10 or 10a is wrapped about the outer peripheral surface 72 of the package 70, portions of the sheet of material 10 or 10a will overlap thereby overlapping portions of the sheet of material 10 or 10a having a pressure sensitive adhesive 24 or 26 thereon and the overlapping portions of the sheet of material 10 or 10a having the pressure sensitive adhesive 24 or 26 thereon will bond to secure the sheet of material 10 or 10a in a wrapped position about the outer peripheral surface 72 of the package 70. The sheet of material 10 or 10a will not bond to the outer peripheral surface 72 per se since the pressure sensitive adhesive 24 or 26 is of the type which only will bond to itself. Also, when the sheet of material 10 or 10a is utilized as a gift wrapping for packages such as the package 70, it is preferable that the sheet of material be constructed of the processed organic polymer film referred to before since this provides a decorative covering and also provides a covering which will not easily tear when wrapped about the outer peripheral surface 72 of the package 70. Also, the sheet of material can be constructed of a foil or paper or cellophane if desired in some applications.

Embodiment of FIG. 12

Shown in FIG. 12 is a modified sheet of material 10d which is constructed exactly like the sheet of material 10 described before, except the sheet of material 10d has a pressure sensitive adhesive 76 applied only to a portion of the upper surface 12d, the pressure sensitive adhesive 76 extending generally about the periphery of the sheet of material 10d and along the first side 16d, the second side 18d, the first end 20d and the second end 22d thereby leaving a substantial portion of the sheet of material 10d without any pressure sensitive adhesive applied either to the upper surface 12d or the lower surface. This particular pattern may be desired in some applications, such as gift wrapping for packages as described before in connection with FIG. 11 wherein the portion of the sheet of material 10d without the pressure sensitive applied either to the upper surface 12d or the lower surface is of a sufficient size to encompass the outer peripheral surface 72 of the package 70 and the overlapping portions generally along the first sides 16d, the second side 18d, the first end 20d and the second end 22d with the pressure sensitive adhesive 76 applied thereto bond those overlapping portions to secure the sheet of material 10d in the wrapped position about the outer peripheral surface 72 of the package 70. Yet, the pressure sensitive adhesive 76 does not contact and bond to the outer peripheral surface Embodiment of FIG. 13

Shown in FIG. 13 is a roll of material 80 wherein the material in the roll is constructed exactly like the sheet of material 10 or 10a described in detail before. In this type of application it is important to control the tackiness of the pressure sensitive adhesive 24 and or 26 so that the material will be easily released from the roll without destroying or damaging the surface of the adjacent material. In use, an individual would tear sheets of material from the roll of material 80 and the sheets of material torn from the roll of material 80 would operate and would be used in a manner exactly like the sheets of material described before in connection with FIGS. 1 through 12. The roll of material 80 simply provides a convenient means for storing and dispensing material which can constructed into a plurality of sheets of material by tearing the sheets of material from the roll of material 80.

The roll of material 80, in some applications, includes a plurality of spaced apart lines of perforations such as the line of perforations 81 shown in FIG. 13. The lines of perforations 81 permit the roll of material to be easily and conveniently torn into sheets of material.

Embodiment of FIG. 14

Shown in FIG. 14 is the roll of material 80 disposed in a container 100, the container 100 having a bottom 102 and opposite sides 104 and 106 encompassing a roll retaining space 108. The roll of material 80, more particularly, is disposed in the roll retaining space 108 in the container 100. The container 100 also has opposite ends (not shown in FIG. 14) connected to the sides 104 and 106 and cooperating with the sides 104 and 106 and the bottom 102 to substantially encompass the roll retaining space 108. The container 100 may also include a lid connected to at least one of the sides 104 or 106 for closing the open upper end of the container 100. A cutter 110 is secured to the upper end of the side 106 and the cutter 110 extends generally along the entire length of the side 106.

In this application, the material is unrolled from the roll of material 80 until the individual has unrolled the desired length of the material and one surface of the material is disposed generally adjacent the cutter 110. The individual then forces the material against the cutter 110 to cut the sheet of material from the roll of material. The sheet of material cut from the roll of material 80 is constructed exactly like the sheets of material described herein and the container 100 simply provides a convenient means for storing the roll of material 80 and dispensing sheets of material therefrom.

The roll of material 80 could include a plurality of lines of perforations for easily and conveniently tearing the sheets of material from the roll of material 80. In this embodiment the cutter 110 could be eliminated.

Embodiment of FIG. 15

Shown in FIG. 15 is another container 120 having a bottom 122 and opposite sides 124 and 126. The bottom 122 and the opposite sides 124 and 126 cooperate with opposite ends (not shown in FIG. 15) to substantially encompass a roll retaining space 128. The roll of material 80 is shown in FIG. 15 disposed in the roll retaining space 128 of the container 120.

A pair of rollers 130 and 132 are rolling supported on the container 100 generally near the upper end of the side 126 and the rollers 130 and 132 are generally aligned so that the outer peripheral surface of the roller 130 engages the outer peripheral surface of the roller 132 generally along the length of the rollers 130 and 132. The roller 130 is connected to a motor 134 and the motor 134 is adapted to rotate the roller 130 in an activated condition of the motor 134. When the motor 134 is drivingly the rotating roller 130, the roller 132 also is rotated due to the engagement between the outer peripheral surfaces of the rollers 130 and 132.

A cutting knife 136 also is supported on the container 120 and the cutting knife 136 is disposed generally above a cutting platform 138 having an opening 140 extending through a portion thereof. The cutting knife 136 is aligned with the opening 140 and the opening 140 is spaced to receive the cutting knife 136 during the operation.

Gear teeth 142 are formed along the portion of the cutting knife 136 and a gear 144 meshingly engages the gear teeth 142. The gear 144 is connected to a motor 146 and, in an activated condition of the motor 146, the motor 146 operates to rotatingly drive the gear 144 thereby moving the cutting knife 136 either in the direction 148 or 150 depending on the direction of rotation of the motor 146. Preferably, the motor 146 is a reversible type of motor so that the motor 146 can drive the gear 144 in both directions of rotation.

It should be noted that, in the embodiment of the invention shown in FIG. 15, only one motor could be utilized in lieu of the two motors 134 and 146 and the single motor could be connected to the rollers 130 and 132 and to the gear 144 with appropriate apparatus and controls for engaging and connecting the motor to either the roller 130 or the gear 144.

In operation, a portion of the material from the roll of material 80 is extended between the outer peripheral surfaces of the two rollers 130 and 132 and the motor 134 is activated to rotatingly drive the rollers 130 and 132 thereby moving the material through the rollers 132 and 134 in a direction 152. The motor 134 drives the rollers 130 and 132 moving the sheet of material in the direction 152 until a predetermined or desired length of material has been moved through the rollers 130 and 132. After the predetermined or desired length of material has been moved through the rollers 130 and 132, the motor 134 is deactivated and the motor 146 is activated to move the cutting knife 136 in the direction 148, a cutting end of the cutting knife 136 engaging the material disposed thereunder and cutting the material as the cutting end portion of the cutting knife 136 moves through the opening 140 of the platform 138. After the material has been cut by the cutting knife 136, the motor 146 is activated to rotate in the opposite direction thereby moving the cutting knife 136 in the upwardly direction 150 and the apparatus shown in FIG. 15 is condition to dispense another sheet of material from the roll of material 80.

The sheets of material cut from the roll of material 80 utilizing the apparatus shown in FIG. 15 are constructed exactly like the sheets of material described herein and the apparatus shown in FIG. 15 merely provides a convenient means for storing and dispensing such sheets of material.

Embodiment of FIG. 16

Shown in FIG. 16 is a container 150 having opposite sides 152 and 154, opposite ends (only one end being shown in FIG. 16) and a bottom 160. The sides 152 and 154 cooperate with the ends 156 and 158 and the bottom 160 to encompass a roll retaining space 162. The roll of material 80 is shown in FIG. 16 disposed within the roll retaining space 162, portions of the roll 80 being shown in dash lines in FIG. 16. A cutting edge 164 is formed along the upper end of the side 154 and the cutting edge 164 extends generally along the entire length of the side 154 generally between the opposite ends 156 and 158. The cutting edge 164 is constructed exactly like the cutting edge 110 described before in connection with FIG. 14.

A brush applicator 166 is connected to the side 154 of the container 150 generally near the upper end of the side 154 and generally adjacent one end of the container 150. The brush applicator 166 comprises an applicator container 168 having an open upper end and surrounding adhesive reservoir, a quantity of pressure sensitive adhesive being disposed in the adhesive reservoir in the applicator container 168. A plurality of brushes 170 are disposed through the open end of the applicator container 168 and one end of the brushes 170 is disposed in the pressure sensitive adhesive contained in the adhesive reservoir formed in the applicator container 168. The opposite ends of the brushes 170 extend a distance outwardly from the open upper end the applicator container 168. The applicator container 168 is positioned on the container 150 so that the brushes 170 are positioned near the cutting edge 164 and positioned so that one end portion of the brushes 170 can engage material for applying the pressure sensitive adhesive to such material.

In operation, an individual pulls material from the roll of material 80 outwardly through the open upper end of the container 150, the brushes 170 engaging and applying pressure sensitive adhesive generally along one side of the material as the material is being unrolled from the roll of material 80. The individual then pulls the material in a direction 172 until the individual has pulled a predetermined or desired amount of the material from the roll of material 80, 6he pressure sensitive adhesive being applied to one surface of the material generally along one edge of the material as the material is being unrolled from the roll of material 80 and pulled in the direction 172. After the individual has moved the material in the direction 172 until a desired length of material has been removed from the roll of material 80, the individual then tears the material generally along the cutting edge 164 thereby forming a sheet of material constructed in accordance with the present invention and having pressure sensitive adhesive on one surface thereof generally along one edge thereof which was applied by the brushes 170 as the material was being removed from the roll of material.

It should be noted that the brushes 170 could extend generally along the entire length of the upper edge of the side 152 generally between the opposite ends of the container 150 for applying pressure sensitive adhesive across substantially the entire surface of the material as the material is being removed from the roll of material 80. Also, a duplicate set of brushes and another applicator container could be disposed near the opposite end so that a strip of pressure sensitive adhesive is applied to both sides of the material as the material is being passed over the two brushes if desired in some applications.

Also, it should be noted that brushes like the brushes 170 and an applicator container like the applicator container 168 could be incorporated in the container 120 shown in FIG. 15 for applying adhesive to the material as the material is being unrolled from the roll of material 80.

In one other embodiment, the rubber rollers 130 and 132 each are adapted to apply pressure sensitive adhesive to the material as it is being moved through the rollers 130 and 132 thereby applying pressure sensitive adhesive to both sides of the sheet of material as the material is being moved in the direction 152 through the rollers 130 and 132 or, in an alternative embodiment, only one of the rollers 130 or 132 can be adapted to apply pressure sensitive adhesive to the adjacent surface of the material as the material is being moved in the direction 152 through the rollers 130 and 132 thereby applying pressure sensitive adhesive to either the upper or the lower surface of the material depending on whether the roller 130 or 132 is adapted to apply the pressure sensitive adhesive.

It also should be noted that the adhesive could be applied with a spray applicator. Also, a dip coating system or a static depositing system could be utilized to apply the adhesive.

Figure 18:
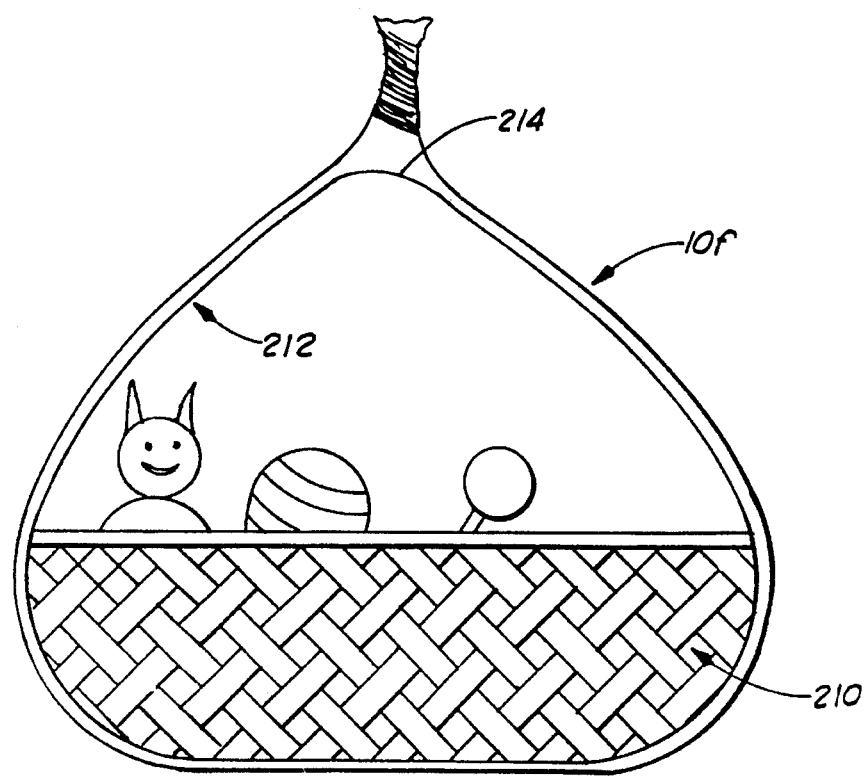
FIG. 18 is a side elevational view of an Easter basket covered with the sheet of material shown in FIG. 17.

Embodiment of FIGS. 17 and 18

Shown in FIGS. 17 is a modified sheet of material 10f which is constructed exactly like the sheet or materials described before, except the sheet of material 10f includes a pressure sensitive adhesive 200 applied to a portion of the lower surface 14f generally adjacent and extending about a peripheral edge 202 thereby leaving a central non-adhesive portion 204 which has no pressure sensitive adhesive.

Shown in FIG. 18 is a typical, commercially available Easter basket 210 which includes a handle 212. The handle 212 extends from an open upper end 214 of the Easter basket 210 and provides a grippable extension so an individual can grip the handle 212 and transport the Easter basket 210.

The Easter basket 210 is placed in a central portion of the sheet of material 10f, the non-adhesive portion 204. The sheet of material 10f then is wrapped over the Easter basket 210 and the handle 212 to a position wherein the peripheral edge 202 of the sheet of material 10f is disposed generally above an upper end portion 214 of the handle 212. The portion of the sheet of material 10f generally near and including the peripheral edge 202 then is pressed together in a manner bringing together the portions of the sheet of material 10f having the adhesive 200 thereon so the portions of the sheet of material 10f generally near the peripheral edge 202 are adhesively connected to close the peripheral edge 202 and connect the sheet of material 10f about the Easter basket 201 and handle 212. The peripheral edge 202 portion of the sheet of material 10f also could be twisted to adhesively connect the portions of the sheet of material near the peripheral edge 202.

Although the basket 210 has been described as an Easter basket, the basket 210 could be a fruit basket or any other type of basket designed to hold items until further, the sheets of material described herein, particularly the sheet of material 10f, could be used to wrap other items such as bread. Further, although the sheet of material 10f is shown in the drawing as being in a square or rectangular configuration, the sheet of material could be circular or any other appropriate configuration.

Changes may be made in the various parts, elements and assemblies as described herein or in the steps of the methods described herein or in the sequence of steps of the methods described herein without departing from the spirit and scope of the invention as defined in the following claims.

I claim:

1. A method for covering a pot means containing a floral grouping wherein the pot means has an outer peripheral surface, a lower end and an open upper end and an inner space formed in a portion thereof, the floral grouping extending a distance above the upper end of the pot means, the method comprising the steps of:

providing a sheet of material having adhesive means on at least a portion thereof and having a sheet extension connected to the sheet of material and extending a distance therefrom;

forming the sheet of material about at least a portion of the outer peripheral surface of the pot means and connecting the sheet of material to the pot means by the adhesive means; and forming the sheet extension about at least a portion of the floral grouping to a position wherein the sheet extension covers at least a portion of the floral grouping.

2. The method of claim 1 wherein the step of providing the sheet of material is defined further as providing the sheet of material constructed of a material selected from the group of material comprising a foil, cellophane or processed organic polymer film or combinations thereof.

3. The method of claim 1 wherein the step of providing the sheet of material is defined further as providing the sheet of material having a thickness in a range from less than about 1.0 mils to about 20 mils.

4. The method of claim 1 wherein the step of providing the sheet of material is defined further as providing the sheet of material having a thickness in a range from less than about 1.0 mils to about 2.5 mils.

5. The method of claim 1 wherein the step of forming the sheet of material about the outer peripheral surface of the pot means is defined further as forming the sheet of material about substantially the entire outer peripheral surface of the pot means.

6. The method of claim 5 wherein the step of forming the sheet of material about the pot means is defined further as forming the sheet of material about the entire outer peripheral surface and lower end of the pot means.

7. The method of claim 1 wherein the step of providing the sheet of material is defined further to include the steps of:

providing a roll of material;

unrolling material from the roll of material until a predetermined amount of material has been unrolled from the roll of material; and cutting the unrolled material from the roll of material to provide the sheet of material.

8. The method of claim 7 wherein the step of providing the sheet of material is defined further to include the step of:

applying the adhesive means to portions of an upper surface of the material as the material is being unrolled from the roll of material to provide the sheet of material having the adhesive means on the portions of the upper surface thereof.

9. The method of claim 7 wherein the step of providing a roll of material is defined further to include the step of:

forming a line of perforations generally at the connection between the sheet extension and the sheet of material.

10. The method of claim 1 wherein the sheet of material is defined further as being sized so that the sheet of material is wrappable about substantially the entire outer peripheral surface of the means.

11. The method of claim 1 wherein in the step of providing the sheet of material, the sheet extension is defined as being sized for encompassing the entire floral grouping, and wherein the step of forming the sheet extension about at least a portion of the floral grouping further comprises forming the sheet extension about and over the floral grouping and encompassing the entire floral grouping.

12. The method of claim 1 wherein in the step of providing the sheet of material the sheet extension is further defined as having an adhesive means on a portion thereof and wherein the step of forming the sheet extension about the floral grouping is defined further as forming the sheet extension about the floral grouping with portions of the sheet extension overlapping and the adhesive means on the sheet extension connecting adjacent overlapping portions of the sheet extension for bonding the sheet extension in a position wherein the sheet extension substantially encompasses the entire floral grouping.

13. The method of claim 1 wherein the sheet of material is defined further as being foldable and bendable whereby the sheet of material can be formed by hand about the pot means.

14. The method of claim 1 wherein in the step of providing the sheet of material, the sheet of material further comprises a line of perforations between the sheet of material and the sheet extension for enabling the separation of the sheet extension from the sheet of material.

15. The method of claim 14 further comprising the step of removing the sheet extension from the sheet of material after the sheet of material has been formed about the pot means and leaving the sheet of material disposed about the pot means as a decorative cover.

16. The method of claim 1 wherein in the step of providing the sheet of material, the sheet of material further comprises a line of perforations between the sheet of material and the sheet extension for enabling the separation of the sheet extension from the sheet of material and further comprising the step of removing the sheet extension from the sheet of material after the sheet extension has been formed about the entire floral grouping and leaving the sheet of material disposed about the pot means as a decorative cover.

17. A method for covering a pot means containing a floral grouping wherein the pot has an outer peripheral surface, a lower end and an open upper end and an inner space formed in a portion thereof, the floral grouping extending a distance above the upper end of the pot means, the method comprising the steps of:

providing a sheet of material having adhesive means on at least a portion thereof;

providing a sheet extension;

forming the sheet of material about at least a portion of the outer peripheral surface of the pot means and connecting the sheet of material to the pot means by the adhesive means; and forming the sheet extension about at least a portion of the floral grouping to a position wherein the sheet extension covers at least a portion of the floral grouping.

18. The method of claim 17 wherein in the steps of providing the sheet of material and providing the sheet extension, the sheet of material and the sheet extension are defined further as being constructed of materials selected from the group of materials comprising a foil, cellophane or processed organic polymer film or combinations thereof.

19. The method of claim 17 wherein in the steps of providing the sheet of material and providing the sheet extension, the sheet of material and the sheet extension are each defined further as having thicknesses in a range from less than about 1.0 mils to about 20 mils.

20. The method of claim 17 wherein in the steps of providing the sheet of material and providing the sheet extension, the sheet of material and the sheet extension are each defined further as having thicknesses in a range from less than about 1.0 mils to about 2.5 mils.

21. The method of claim 17 wherein the step of forming the sheet of material about the outer peripheral surface of the pot means is defined further as forming the sheet of material about substantially the entire outer peripheral surface of the pot means.

22. The method of claim 21 wherein the step of forming the sheet of material about the pot means is defined further as forming the sheet of material about the entire outer peripheral surface and lower end of the pot means.

23. The method of claim 17 wherein the step of providing the sheet of material is defined further to include the steps of:

providing a roll of material;

unrolling material from the roll of material until a predetermined amount of material has been unrolled from the roll of material; and cutting the unrolled material from the roll of material to provide the sheet of material.

24. The method of claim 23 wherein the step of providing the sheet of material is defined further to include the step of:

applying the adhesive means to portions of an upper surface of the material as the material is being unrolled from the roll of material to provide the sheet of material having the adhesive means on the portions of the upper surface thereof.

25. The method of claim 17 wherein in the step of providing the sheet extension, the sheet extension is defined as being sized for encompassing the entire floral grouping, and wherein the step of forming the sheet extension about at least a portion of the floral grouping further comprises forming the sheet extension about and over the floral grouping and encompassing the entire floral grouping.

26. The method of claim 17 wherein in the step of providing the sheet extension the sheet extension is further defined as having an adhesive means on a portion thereof and wherein the step of forming the sheet extension about the floral grouping is defined further as forming the sheet extension about the floral grouping with portions of the sheet extension overlapping and the adhesive means on the sheet extension connecting adjacent overlapping portions of the sheet extension for bonding the sheet extension in a position wherein the sheet extension substantially encompasses the entire floral grouping.

27. The method of claim 17 wherein the sheet of material is defined further as being foldable and bendable whereby the sheet of material can be formed by hand about the pot means.

28. A method for covering a pot means containing a floral grouping wherein the pot has an outer peripheral surface, a lower end and an open upper end and an inner space formed in a portion thereof, the floral grouping extending a distance above the upper end of the pot means, the method comprising the steps of:

providing a sheet of material, the sheet of material having a sheet extension connected thereto and extending a distance therefrom;

forming the sheet of material about at least a portion of the outer peripheral surface of the pot means;

connecting the sheet of material to the outer peripheral surface of the pot means by an adhesive means; and forming the sheet extension about at least a portion of the floral grouping to a position wherein the sheet extension covers at least a portion of the floral grouping.

29. The method of claim 28 wherein in the step of providing the sheet of material, the sheet of material further comprises a line of perforations between the sheet of material and the sheet extension for enabling the separation of the sheet extension from the sheet of material.

30. The method of claim 28 further comprising the step of removing the sheet extension from the sheet of material after the sheet of material has been formed about the pot means and leaving the sheet of material disposed about the pot means as a decorative cover.

31. The method of claim 28 wherein in the step of providing the sheet of material, the sheet of material further comprises a line of perforations between the sheet of material and the sheet extension for enabling the separation of the sheet extension from the sheet of material and further comprising the step of removing the sheet extension from the sheet of material after the sheet extension has been formed about the entire floral grouping and leaving the sheet of material disposed about the pot means as a decorative cover.

32. The method of claim 28 wherein the step of forming the sheet of material about the outer peripheral surface of the pot means is defined further as forming the sheet of material about substantially the entire outer peripheral surface of the pot means.

33. The method of claim 32 wherein the step of forming the sheet of material about the pot means is defined further as forming the sheet of material about the entire outer peripheral surface and lower end of the pot means.

34. The method of claim 28 wherein the step of providing the sheet of material is defined further to include the steps of:

providing a roll of material;

unrolling material from the roll of material until a predetermined amount of material has been unrolled from the roll of material; and cutting the unrolled material from the roll of material to provide the sheet of material.

35. The method of claim 28 wherein in the step of providing the sheet extension, the sheet extension is defined as being sized for encompassing the entire floral grouping, and wherein the step of forming the sheet extension about at least a portion of the floral grouping further comprises forming the sheet extension about and over the floral grouping and encompassing the entire floral grouping.

36. The method of claim 28 wherein in the step of providing the sheet extension the sheet extension is further defined as having an adhesive means on a portion thereof and wherein the step of forming the sheet extension about the floral grouping is defined further as forming the sheet extension about the floral grouping with portions of the sheet extension overlapping and the adhesive means on the sheet extension connecting adjacent overlapping portions of the sheet extension for bonding the sheet extension in a position wherein the sheet extension substantially encompasses the entire floral grouping.

37. A method for covering a pot means containing a floral grouping wherein the pot has an outer peripheral surface, a lower end and an open upper end and an inner space formed in a portion thereof, the floral grouping extending a distance above the upper end of the pot means, the method comprising the steps of:

providing a wrapper having a lower portion for covering the outer peripheral surface of the pot means and an upper portion for covering the floral grouping and wherein the upper portion is removable from the lower portion;

forming the lower portion of the wrapper about at least a portion of the outer peripheral surface of the pot means;

connecting the lower portion of the wrapper to the outer peripheral surface of the pot means by a bonding means disposed upon a surface of the lower portion of the wrapper; and forming the upper portion of the wrapper about at least a portion of the floral grouping to a position wherein the upper portion of the wrapper covers at least a portion of the floral grouping.

38. The method of claim 37 wherein in the step of providing the wrapper, the wrapper further comprises a line of perforations between the upper portion and the lower portion for enabling the separation of the upper portion from the lower portion.

39. The method of claim 37 further comprising the step of removing the upper portion from the lower portion after the lower portion has been formed about the pot means and leaving the lower portion disposed about and bondingly connected to the pot means as a decorative cover.

40. The method of claim 37 wherein in the step of providing the wrapper, the wrapper further comprises a line of perforations between the upper portion and the lower portion for enabling the separation of the upper portion from the lower portion and further comprising the step of removing the upper portion from the lower portion after the upper portion has been formed about the entire floral grouping and leaving the lower portion disposed about and bondingly connected to the pot means as a decorative cover.

41. The method of claim 37 wherein the step of forming the lower portion of the wrapper about the outer peripheral surface of the pot means is defined further as forming the lower portion of the wrapper about substantially the entire outer peripheral surface of the pot means.

42. The method of claim 41 wherein the step of forming the lower portion of the wrapper about the pot means is further defined as forming the lower portion of the wrapper about the lower end of the pot means.

43. The method of claim 37 wherein the step of providing the wrapper is defined further to include the steps of:

providing a roll of material;

unrolling material from the roll of material until a predetermined amount of material has been unrolled from the roll of material; and cutting the unrolled material from the roll of material to provide the wrapper.

44. The method of claim 37 wherein in the step of providing the wrapper, the upper portion of the wrapper is defined as being sized for encompassing the entire floral grouping, and wherein the step of forming the upper portion about at least a portion of the floral grouping further comprises forming the upper portion about and over the floral grouping and encompassing the entire floral grouping.

45. The method of claim 37 wherein in the step of providing the wrapper the upper portion of the wrapper is further defined as having a bonding means on a portion thereof and wherein the step of forming the upper portion about the floral grouping is defined further as forming the upper portion about the floral grouping with portions of the upper portion of the wrapper overlapping the bonding means thereon bondingly connecting adjacent overlapping portions of the upper portion for holding the upper portion in a position wherein the upper portion substantially encompasses the entire floral grouping.

* * * * *

UNITED STATES PATENT AND TRADEMARK OFFICE
CERTIFICATE OF CORRECTION

PATENT NO. : 5,560,181
DATED : October 1, 1996
INVENTOR(S) : Weder

It is certified that error appears in the above-identified patent and that said Letters Patent is hereby corrected as shown below:

Column 3, line 33, please delete "adhesive. 24" and substitute therefor --adhesive 24--.

Column 4, line 7, please delete "12a" and substitute therefor --10a--.

Column 5, line 15, please delete "is should" and substitute therefor --should--.

Column 5, line 41, please delete "16b a" and substitute therefor --16b--.

Column 7, line 43, please delete "is waterproof" and substitute therefor --waterproof--.

Column 10, line 19, please delete "can constructed" and substitute therefor --can be constructed--.

Column 11, line 34, please delete "134" and substitute therefor --130--.

Column 11, line 49, please delete "condition" and substitute therefor --conditioned--.

Column 12, line 29, please delete "6he" and substitute therefor --the--.

Column 13, line 10, please delete "or" and substitute therefor --of--.

UNITED STATES PATENT AND TRADEMARK OFFICE
CERTIFICATE OF CORRECTION

PATENT NO. : 5,560,181
DATED : October 1, 1996
INVENTOR(S) : Weder

It is certified that error appears in the above-identified patent and that said Letters Patent is hereby corrected as shown below:

Column 13, line 32, please delete "201" and substitute therefor --210--.

Signed and Sealed this

Twenty-second Day of April, 1997

Attest:

BRUCE LEHMAN

Attesting Officer

*Commissioner of Patents and Trademarks*